United States Patent [19]

Foster et al.

[11] Patent Number: 4,960,810

[45] Date of Patent: Oct. 2, 1990

[54] POLYMER COMPOSITIONS STABILIZED WITH POLYDIALKYLSILOXANES CONTAINING SILOXY UNITS HAVING CERTAIN DEFINED PENDANT STERICALLY HINDERED PHENOL MOIETIES

[75] Inventors: George N. Foster, Bloomsbury, N.J.; Herbert E. Petty, Bethel, Conn.; Charles H. Blevins, II., Beacon, N.Y.

[73] Assignee: Union Carbide Chemicals and Plastics Company Inc., Danbury, Conn.

[21] Appl. No.: 330,810

[22] Filed: Mar. 30, 1989

[51] Int. Cl.$^5$ .............................................. C08K 5/24
[52] U.S. Cl. .................................... 524/265; 524/267; 524/269
[58] Field of Search ...................... 524/265, 267, 269

[56] References Cited

U.S. PATENT DOCUMENTS

| | | | |
|---|---|---|---|
| 3,073,789 | 1/1963 | Goldstein et al. | 524/265 |
| 3,328,350 | 6/1967 | Omietanski et al. | 260/46.5 |
| 3,328,450 | 6/1967 | Plueddemann | 260/448.8 |
| 3,579,467 | 5/1971 | Brown | 252/46.3 |
| 4,430,235 | 2/1984 | Chu et al. | 252/49.6 |
| 4,645,844 | 2/1987 | Berger et al. | 207/40 |
| 4,724,248 | 2/1988 | Dexter et al. | 524/265 |

OTHER PUBLICATIONS

CA Selects Organosilicon Chemistry: Issue 8, 1986, p. 14, #131201e; Issue 9, 1986, p. 21, #150606g; Issue 10, 1986, p. 10, #1691164; Issue 14, 1986, p. 11, #7394b; Issue 17, 1986, p. 12, #61488y.

*Primary Examiner*—Melvyn I. Marquis
*Attorney, Agent, or Firm*—Bonnie L. Deppenbrock

[57] ABSTRACT

The present invention relates to olefin polymers stabilized with polydialkylsiloxanes containing pendant sterically hindered phenol moieties. The compounds are represented by the general formula $MD_xD^*_yM_A2$.

14 Claims, No Drawings

POLYMER COMPOSITIONS STABILIZED WITH POLYDIALKYLSILOXANES CONTAINING SILOXY UNITS HAVING CERTAIN DEFINED PENDANT STERICALLY HINDERED PHENOL MOIETIES

FIELD OF THE INVENTION

The present invention is directed to stabilized olefin polymer compositions in which the stabilizer is a polydialkylsiloxane containing siloxy units having defined pendant sterically hindered phenol moieties connected to the silicon atom of the siloxy unit via a carbonyloxy-containing link.

BACKGROUND

A common problem encountered with natural and synthetic materials, particularly synthetic organic polymers, is instability on exposure to light, atmospheric conditions and elevated temperatures, as well as the adverse effects exerted on the polymers by the minute amounts of catalyst residues often present in the synthetic polymers, which frequently lead to physical deterioration and color change. Over the years industry has resorted to the addition of a wide variety of antioxidants, ultraviolet light absorbers and heat stabilizing agents to the polymers but it still exerts a continuing effort to find new materials that will accomplish the same or improved objectives without affecting other properties that may have a deleterious effect on subsequent manufacturing and processing operations. It is also known in industry that a compound that stabilizes against heat and/or oxygen degradation may not stabilize against light degradation in the same material, and vice versa. It is further known that a compound which exerts some form of stabilization in one type of material may be completely ineffective in another type of material. Thus, compounds are classified as antioxidants, light stabilizers, heat stabilizers, etc., depending upon the stabilizing effect a particular compound may have on a specific material or type of material. Further, in many cases, mixtures of stabilizers are used to obtain desired protection against one or more forms of degradation.

It is also known that residues from the polymerization of alpha-olefin polymers using transition metal catalysts, such as the Ziegler and Natta type catalysts, show adverse effects on both stability and product color. In order to off-set the adverse effects caused by the catalyst residues increased amounts of stabilizers have been required. The adverse effects result, in part, from the reaction of the transition metal residues of the catalysts with the conventional hindered phenolic antioxidants employed or their breakdown products as the antioxidants act as radical terminators. The halide or chloride residues of the catalysts can react with the conventional hindered phenolic antioxidants catalyzing its dealkylation and promoting the autooxidation. Further, phenolate salts or coordination complexes can form that are chromophores. This is especially easy with the acid catalyzed dealkylation of the conventional hindered phenolic antioxidants.

A common widely used commercial practice has been the addition of metallic stearates of zinc, magnesium, and/or calcium as acid acceptors with the conventional hindered phenolic antioxidants. However, the use of metallic stearates can cause plate-out or die lip build-up problem, and they often interfere with heat sealing and ink adhesion. Ultrafine zinc oxide or hydrotalcite (a hydrate of magnesium carbonate/aluminum hydroxide) can be used to replace the metal stearates in some instances, however, these inorganic materials often show dispersion problems. Such inorganic materials by themselves or when wetted with small amounts of metal stearates are not effective in controlling discoloration but show a positive effect on reducing corrosivity.

Another practice, often used to further improve color and stability during melt processing, is the addition of phosphite ester derived from nonylphenol or 2,4-di-t-butylphenol.

It has now been found that a novel class of polysiloxanes having pendant sterically hindered phenol moieties connected to the silicon atom via a carbonyloxy-containing link stabilize synthetic polymers against the deleterious effect caused by exposure to atmospheric conditions.

Polysiloxanes containing t-butyl substituted phenyl groups have been known for many years. Thus, U.S. Pat. No. 3,328,350, issued June 27, 1967 to G. M. Omietanski et al., discloses polysiloxanes of superior stability towards oxidative degradation which are the reaction products of selected substituted phenols with acyloxy terminated polysiloxanes. The final product contains the phenyl group in the polymer chain and it is not a pendant group.

In U.S. Pat. No. 3,328,450, issued June 27, 1967 to E. P. Plueddemann, there are disclosed alkyl phenol-substituted organosilicon compounds and polysiloxanes containing such compounds. However, none of the compounds disclosed contain a pendant sterically hindered phenol moiety connected to the silicon atom via a carbonyloxy-containing link.

The disclosure in U.S. Pat. No. 3,579,467, issued May 18, 1971 to E. D. Brown, also disclosed polysiloxanes containing a phenol moiety. However, the phenol moiety is not connected to the silicon atom via a carbonyloxy-containing link.

In U.S. Pat. No. 4,430,235, issued Feb. 7, 1984 to N. S. Chu et al., polymeric siloxane antioxidants are disclosed that contain an antioxidant moiety, for example, a hindered phenolic group. However, the reference does not suggest or disclose any compound in which the phenolic moiety is connected to the silicon atom via a carbonyloxy-containing link.

U.S. Pat. No. 4,535,113, issued Aug. 13, 1985 to G. N. Foster, et al., discloses olefin polymer compositions containing silicone additives. The siloxane additives, however, are not those described in the instant invention.

The invention described in U.S. Pat. No. 4,645,844, issued Feb. 24, 1987 to A. Berger et al., discloses phenoxy containing silane compounds wherein the phenoxy group is attached to the silicon atom via a methylene or alkylene link and nowhere suggests or discloses a connection via a carbonyloxy-containing link.

A number of abstracts in CA Selects Organosilicon Chemistry disclose a variety of phenol-substituted silanes useful as antioxidants, however, none of them disclose or suggest the compounds of this invention. (See: the silane of Issue 8, 1986, page 14, abstract 131201e; the disiloxane of Issue 9, 1986, page 21, abstract 150606g; the disiloxane of Issue 10, 1986, page 10, abstract 169116u; the silane of Issue 14, 1986, page 11, abstract 7394b; and the silane of Issue 17, 1986, page 12, abstract 61488y.)

It has now been found that certain polydialkylsiloxanes containing siloxy units having defined pendant sterically hindered phenol moieties connected to silicon atom of the siloxy units via a carbonyloxy-containing link, alone or in combination with other stabilizers, stabilize synthetic olefin polymers against the deleterious effect caused by exposure to light, heat and metal catalyst residues.

SUMMARY OF INVENTION

The present invention is directed to polymer compositions stabilized with a stabilizing a polydialkylsiloxane of the general formula:

Ti M D$_X$D$_Y$* M     (I)

wherein M, D, D*, x and y are as hereinafter defined, said polydimethylsiloxane containing siloxy units having defined pendant sterically hindered phenol moieties connected to the silicon atom of the siloxy units via a carbonyloxy-containing link.

DESCRIPTION OF THE INVENTION

The olefin polymers have become one of the major industrial products manufactured, the amount produced annually running in the multi-billions of pounds. They vary in composition from polymers consisting essentially of a single polymerized hydrocarbon olefin having two or more carbon atoms in the monomer molecule, e.g., ethylene or propylene, to polymers containing two or more polymerized olefins, to polymers of such olefins modified with one or more copolymerizable monomers that can be monounsaturated or polyunsaturated. Illustratively, such comonomers include propene, isoprene, the butenes, butadiene, the pentenes, hexenes, heptenes and octenes, styrene, as well as many other polymerizable hydrocarbon monomers. Also included are monomers such as the polymerizable unsaturated monomers containing other atoms, such as acrylic and methacrylic acid; acrylonitrile and methacrylonitrile; the esters such as vinyl acetate and the acrylate and methacrylate esters methyl acrylate, methyl methacrylate, 2-ethylhexyl acrylate, and the like; the ethers such as vinyl ethyl ether, and the like; the ketones such as vinyl ethyl ketone and the like; as well as hosts of other alpha olefinically unsaturated monomers known to those skilled in the art of olefin homopolymers and copolymers.

It is also known that the olefin polymers have a wide variety of properties. They can be liquids, solids, rubbers, linear, branched, rigid, flexible, crosslinked, etc. They also vary in the amount of hydrocarbon olefin polymerized in the molecules from polyolefins that are 100 percent hydrocarbon olefin, e.g. polyethylene and polypropylene, to polymers in which the hydrocarbon olefin polymerized in the molecule can be as low as about 60 weight percent with the balance comprising one or more of the other types of comonomers. Regardless of their composition, the stabilizers of this invention have been found to have a stabilizing effect on the olefin polymers. For the purpose of this invention the term "olefin polymer" signifies a polymer which contains about 60 weight percent or more polymerized hydrocarbon olefin(s) in the polymer molecule as well as blends of olefin polymers with one another or with other polymers. These polymers are well known in the art and many are commercially available produced by a multiplicity of processes, among which processes are those initially discovered by Ziegler and Natta involving the use of transition metal catalysts.

Illustrative of olefin polymers one can mention the normally solid polymers including the homopolymers of olefins as well as interpolymers of one or more olefins with each other and/or up to about 40 percent by weight of one or more monomers which are copolymerizable with such olefins; homopolymers and interpolymers of such olefins as ethylene, propylene, butene 1, isobutylene, hexene 1, 4-methyl-pentene-1, pentene-1, octene-1, nonene-1, decene-1, as well as interpolymers of one or more of such olefins and one or more of other monomers which are interpolymerizable with such alpha-olefins, such as vinyl and diene compounds, and the like.

Exemplary interpolymers are the ethylene copolymers such as ethylene propylene copolymers, ethylene-butene-1 copolymers, ethylene-hexene-1 copolymers, ethylene-octene-1 copolymers, polymers of ethylene and two or more of the following compounds: propylene, butene-1, hexene-1, 4-methyl-pentene-1, octene-1, butadiene, dicyclopentadiene, hexadiene, ethylidene norbornene and the like.

Also included in the term olefin polymer are blends of one polymer with one or more other polymers. Illustrative of such blends are the olefin polymers with one or more of the following: polypropylene, high pressure polyethylene, low-density polyethylene, high density polyethylene, polybutene 1 and a polar monomer, olefin copolymers such as ethylene/acrylic acid copolymers, ethylene/-methyl acrylate copolymers, ethylene/ethyl acrylate copolymers, ethylene/vinyl acetate copolymers, ethylene/acrylic acid/ethyl acrylate terpolymers, acrylonitrile-butadiene-styrene polymers, ethylene/-acrylic acid/vinyl acetate terpolymers, and the like, as well as the salts thereof, e.g., the ionomers.

Particularly preferred ethylene polymers for purposes of this invention are low pressure, substantially linear ethylene homopolymers and ethylene-C$_3$ to C$_8$ alpha olefin interpolymers having a density of about 0.85 to about 0.97, preferably about 0.875 to about 0.93. These interpolymers can be prepared by reacting a mixture containing about 50 to 99.9 mole percent, preferably about 75 to 96 mole percent ethylene, and from about 0.1 to 50 mole percent and preferably about 4 to about 25 mole percent of one or more C$_3$ to C$_8$ alpha olefins such as propylene, butene-1, pentene-1, 4-methyl-pentene-1, hexene-1, heptene-1, octene-1, and the like, or a diolefin using a magnesium chloride/titanium chloride catalyst and employing low pressures on the order of about 15 to 300 psi as disclosed in U.S. Pat. No. 4,302,565. Other processes are known in which the catalyst can be a transition metal compound, e.g. chromium oxide, as well as any of the known Ziegler and Natta catalytic processes.

The discovery that the liquid to solid polysiloxanes having pendant sterically hindered phenol moieties of formula (I) either alone or in combination with other stabilizers have a stabilizing effect on olefin polymers was completely surprising and unexpected. The polydialkyl siloxanes of formula (I) useful as stabilizers have the general formula:

MD$_X$D*$_y$M     (I)

wherein

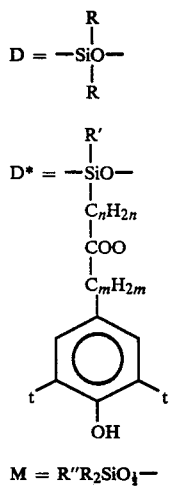

M = R''R$_2$SiO$_{\frac{1}{2}}$— wherein
R is phenyl or a lower alkyl group having from 1 to about 3 carbon atoms, preferably methyl;
R' is an alkyl group having from 1 to about 8 carbon atoms, preferably 1 to 3 carbon atoms, phenyl or phenethyl;
R'' is phenyl, or an alkyl group having from 1 to about 30 carbon atoms, preferably from 1 to about 20 carbon atoms and most preferably 1 to about 3 carbon atoms, or an alkoxy group having from 1 to about 30 carbon atoms, preferably from about 12 to about 20 carbon atoms;
n has a value of from 0 to about 10, preferably 1 to 3;
m has a value of from 3 to about 12, preferably 2 or 3;
t is t-butyl;
x has a value of from 0 to about 250 or more, preferably less than about 100;
y has a value of from about 2 to about 250 or more, preferably from about 4 to about 25;
the sum of x plus y can vary from 4 to about 500 or more with the ratio of x:y varying from about 1:1 to about 9:1.

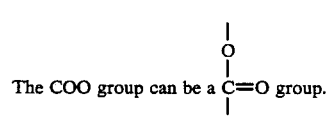

The COO group can be a C=O group.

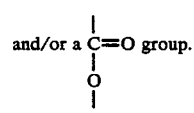

and/or a C=O group.

As is known the substituents on a single silicon atom need not all be the same. Thus, they can all be methyl groups or they can be a combination of two or more alkyl groups or other of the groups heretofore defined.

The polysiloxane chain can also contain any of the other siloxane units known to those skilled in the art.

Included among the, polysiloxanes having pendant sterically hindered phenol moieties of this invention are the linear or the branched or star-type polymers that contain either one or more S unit or T unit or Q unit, in the polysiloxane chain, these units being represented by the formulas:

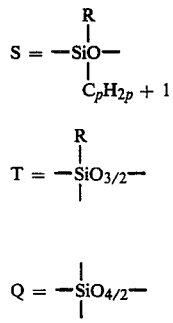

wherein p has a value of 3 to about 50.

The preferred polydialkylsiloxanes of Formula (I) are the polydimethylsiloxanes and the most preferred are those in which all of the R groups in the moieties are methyl groups.

Illustrative typical polydialkylsiloxane polymers useful in this invention are listed in Table I. In this table the numerals below the siloxane units identified in the heading indicate the average number of each such unit in the polymer chain, keeping in mind, as is known in the art, that all of a specifically identified unit need not necessarily be confined to a single segment in the polymer molecule.

TABLE I

| M | D | D* | M |
|---|---|----|---|
| 1 | 10 | 1 | 1 |
| 1 | 5 | 4 | 1 |
| 1 | 15 | 5 | 1 |
| 1 | 10 | 5 | 1 |
| 1 | 5 | 5 | 1 |
| 1 | 10 | 4 | 1 |
| 1 | 4 | 4 | 1 |
| 1 | 5 | 9 | 1 |
| 1 | 3 | 10 | 1 |
| 1 | 10 | 10 | 1 |
| 1 | 5 | 10 | 1 |
| 1 | 5 | 15 | 1 |
| 1 | 15 | 15 | = |
| 1 | 20 | 20 | = |

Illustratively, the polydialkylsiloxanes containing the D* group are conveniently produced by the direct catalytic hydrosilanation of a compound having a terminal vinyl group, e.g., 4 (2-propenyl)-2,6-di-t- butylphenol or allyl-3-(3,5-di-(t-butyl)-4- hydroxyphenyl) propanoate, with a free hydroxyl group present on one of the siloxy units of a polysiloxane. Another method involves the catalytic hydrosilanation of the polydialkylsiloxane with allyl alcohol followed by transesterification with the methyl or ethyl ester of 3,5-di-(t-butyl)-4-carboxypropylphenol. Still another method involves the transesterification of an ester modified siloxy group with a hindered phenol via an available hydroxyl group, e.g., 2,6 di-(t butyl) 4- hydroxyethylphenol. These general procedures are among those known to those of average skill in the art. In addition, any of the other known procedures can be used.

In the reactions an inert solvent is used, such as toluene, xylene, mesitylene, or higher alkane, which is subsequently removed by distillation or desolvation techniques. The reaction is generally carried out at reflux temperature in the presence of a catalyst.

The amount of stabilizer polydialkylsiloxane of Formula (I) that is added to the olefin polymer is an amount sufficient to exert a stabilizing effect on the polymer. This amount can vary from about 0.005 percent to about 2 percent, preferably from about 0.01 to about 0.5 percent, most preferably from about 0.05 percent to about 0.3 percent, based on the weight of the olefin polymers.

In addition there can also be added any of the other known light, thermal and chemical stabilizing agents, antioxidants, fillers, pigments, lubricants, slip agents, antiblock agents, as well as any of the other additives previously known as suitable for use with olefin polymers. These materials and the concentrations at which they are used are well known to those skilled in this art, e.g., silica, calcium carbonate, carbon black, talc, mica and magnesium hydroxide being a few representative examples thereof.

The preparation of the stabilized olefin polymer composition can be carried out by any suitable means, for example, by adding the stabilizer to the solid olefin polymer (in pellet, granule, powder, etc., form) and mixing or tumbling. or by fluxing the olefin polymer with the stabilizer on heated rolls, or by the use of a Banbury mixer or of heated extruders, and the like or by a combination thereof. The equipment and procedures are well established in the art.

Experiments 1 to 3 show the preparation of polydialkylsiloxanes of generic Formula I used in the stabilization of olefin polymers in accord with this invention.

Experiment 1

A one liter 3-neck flask was equipped with thermometer, mechanical stirrer and distillation head/receiver assembly and was charged with 70g of toluene, 100g of $MD_{10}D'_{10}M$ of the formula:

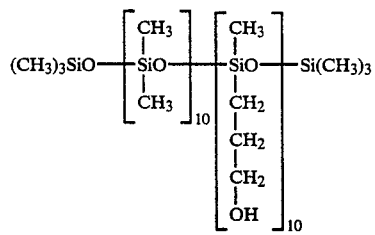

and 14 of methyl 2-[3,5 di (t-butyl) 4-hydroxyphenyl]-propanoate. The mixture was stirred and heated under nitrogen and at about 45° C. a clear solution resulted at which point 1.5 of tetraisopropyl titanate catalyst was added. The reaction was stirred at reflux (120° C. flask temperature) for about 4 hours. Distillate, 42.3g, was recovered (90°-97° C. head temperature), which analysis showed to be 35% methanol and 65% toluene, by weight. Continued distillation removed another 41.2g of toluene. The flask contents were diluted with toluene, washed with water, dried over anhydrous sodium sulfate and concentrated to yield 210g of viscous fluid of the nominal structure

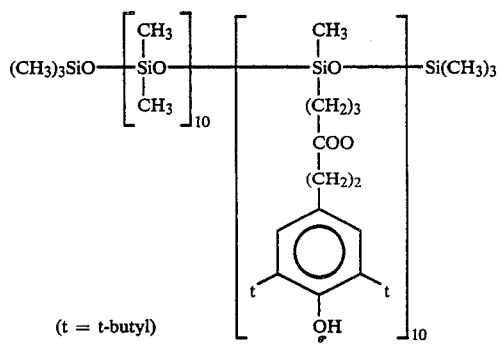

(t = t-butyl)

whose structure was confirmed by NMR analysis.

Experiment 2

Using a reactor assembly and procedure similar to that described in Experiment 1, 740 grams of polysiloxane $MD_{15}D'_5M$ was reacted with 623.4g of methyl 2-[3,5-di-(t-butyl)-4-hydroxyphenyl]propanoate and 6.8g of the catalyst using 410g of toluene. There was recovered 1,225 g of viscous fluid of the nominal structure

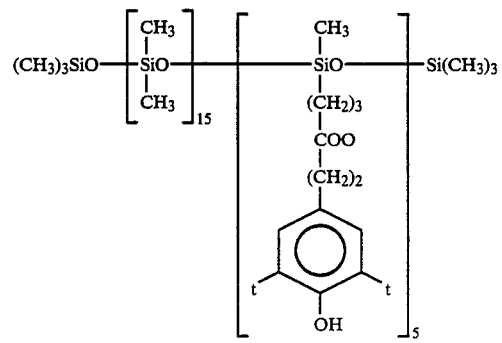

Experiment 3

Using a reflector assembly similar to that described in Example 1, a polysiloxane of the nominal structure

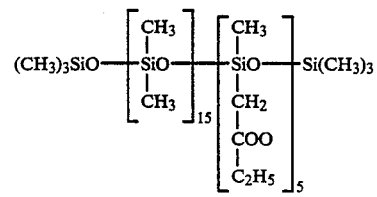

is transesterfied with 2,6-di-(t-butyl)-4-hydroxyethylphenol to yield a polysiloxane of the nominal structure

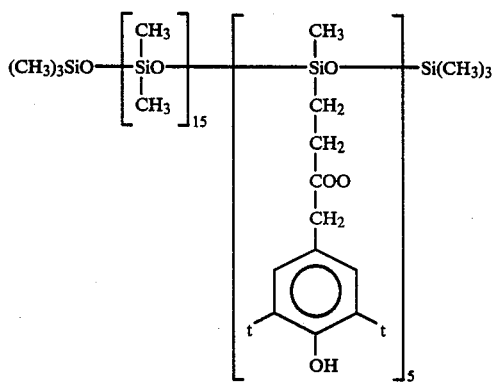

An accurately weighed amount of the polysiloxane stabilizer was added to 400 g of the olefin polymer to provide a total concentration of 500 ppm of the polysiloxane stabilizer in the blend. Each mixture was mixed in a Waring blender for five minutes to ensure thorough mixing and dispersion and then extruded using a Brabender Plasticorder ® extruder fitted with a one inch diameter extruder screw, a 25:1 length/diameter ratio and a 2 inch by 0.125 inch tape die. All zones of the extruder, including the die, were heated to 250° C. prior to the performance of the balance of the procedure.

The extruder was purged for 10 minutes at 50 rpm with an additional quantity of the virgin, non-stabilized olefin polymer and this was followed by introduction of the stabilized olefin polymer composition prepared above. The stabilized olefin polymer composition was extruded for a period of 5 minutes and collected as a 0.125 inch thick tape. The extruder was then purged with an additional quantity of the virgin, non-stabilized olefin polymer followed by the subsequent batch of stabilized copolymer composition. This alternating procedure was repeated for the preparation of the tapes for each stabilized olefin polymer composition.

The tape extrudates were pressed at 160° C. to form 0.1 inch thick plagues for the DSC measurements and at 175° C. to form 0.125 inch thick plaques for its yellowness index measurements. For comparative purposes the same olefin polymer was tested without additives and with conventional, heretofore available additives.

The following designations are used in the examples to identify the components employed:

Polyolefin A an ethylene/1-butene olefin polymer of U.S. Pat. No. 4,508,842 prepared using a vanadium trichloride/aluminum trialkyl catalyst and having a melt index of 0.99 dg/min.

Polyolefin B - an ethylene /1-butene olefin polymer prepared using a titanium trichloride/magnesium chloride/aluminum trialkyl catalyst and having a melt index of 0.92 dg.min.

PS-A a polydialkylsiloxane of Experiment 2 structure.

PS-B - a polydialkylsiloxane of the nominal structure $MD_{15}D'_5M$ where all of the R groups are methyl groups and D is the group:

SiO(CH$_3$)(CH$_2$CH$_2$CH$_2$OH)

Additive 1 - zinc stearate
Additive 2 - zinc oxide
Additive 3 - octadecyl 3-(3,5-di-t-butyl-4-hydroxyphenyl) propionate
Additive 4 - tris(2,4-t-butylphenyl) phosphite
Additive 5 - styrenated, butylated m-cresol Yellowness Index was determined in accordance with ASTM D-1925-70, before and after aging at 60° C. for 4 weeks. A Pacific Scientific Colorgard System ®/05 instrument was used in determination of the color Melt Index and Melt Flow Ratio represent the melt viscosity of the polyolefin at a prescribed temperature under various pressure in accordance with ASTM D 1238 conditions E and F. Data was collected with the aid of a Tinius Olsen Plastograph ®

DSC-OIT is an indication of the thermal stability of the polymer; it represents the measurement in minutes of the oxidation induction time using a differential scanning calorimeter at the specified temperature and is determined in accord with normally accepted and known procedures.

The following examples serve to further illustrate the invention. Parts are by weight unless otherwise indicated.

EXAMPLE 1

Blends were prepared in a Waring blender and extruded as previously described above using the polydialkylsiloxane stabilizer of this invention and compared with virgin resin extruded in the same manner. The results are shown in Table II. The unexpected effectiveness of the presence of the polydialkylsiloxane stabilizers of this invention on thermal oxidation stability is evident from the data.

TABLE II

| Run | 1 | 2 |
|---|---|---|
| Polyolefin A | 99.91 | 100 |
| PS-A | 0.05 | — |
| PS-B | 0.05 | — |
| Additive 2 | 0.02 | — |
| Yellowness Index | | |
| Initial | 9.5 | 13 |
| Thermal Oxidation | | |
| DSC-OIT at 180° C., min | 3.9 | <0.3 |
| Melt Flow Properties | | |
| Melt Index, dg/min | 1.21 | 0.92 |
| Melt Flow Ratio | 57 | 68 |

EXAMPLE 2

A blend was prepared in a manner similar to that described in Example 1 using the polydialkylsiloxane stabilizer of this invention and compared to blends with conventional stabilizers and virgin olefin polymer. The results are shown in Table III.

TABLE III

| Run | 1 | 2 | 3 | 4 |
|---|---|---|---|---|
| Polyolefin B | 99.95 | 100 | 99.95 | 99.95 |
| PS-A | 0.5 | — | — | — |
| Additive 3 | — | — | 0.05 | — |
| Additive 5 | — | — | — | 0.05 |
| Thermal Oxidation | | | | |
| DSC-OIT, min. | | | | |
| at 190° C. | 3.09 | 0.25 | 19.63 | 4.42 |
| at 180° C. | 10.63 | 0.27 | >30 | 11.36 |

Example 3

A blend was prepared in a manner similar to that described in Example 1 using the polydialkylsiloxane stabilizer of this invention and compared to blends with mixtures of a conventional stabilizer and conventional neutralizers and virgin olefin polymers. The results are shown in Table IV.

TABLE IV

| Run | 1 | 2 | 3 | 4 |
|---|---|---|---|---|
| Polyolefin B | 99.9 | 100 | 99.9 | 99.9 |
| PS-A | 0.5 | — | — | — |
| Additive 3 | — | — | 0.05 | — |
| Additive 5 | — | — | — | 0.05 |
| Additive 1 | 0.25 | 0.25 | 0.25 | 0.25 |
| Additive 2 | 0.25 | 0.25 | 0.25 | 0.25 |
| Thermal Oxidation DSC-OIT, min. | | | | |
| at 190° C. | 3.88 | 0.25 | 15.82 | 5.73 |
| at 180° C. | 8.32 | 0.27 | >30 | 13.49 |

Example 4

A blend was prepared in a manner similar to that described in Example 1 using a mixture of the polydialkylsiloxane stabilizer of this invention and a conventional antioxidant and compared to blends with mixtures of conventional neutralizers. The results are shown in Table V.

TABLE V

| Run | 1 | 2 | 3 | 4 |
|---|---|---|---|---|
| Polyolefin A | 99.85 | 100 | 99.85 | 99.85 |
| PS-A | 0.05 | — | — | — |
| Additive 3 | — | — | 0.05 | — |
| Additive 5 | — | — | — | 0.05 |
| Additive 4 | 0.05 | — | 0.05 | 0.05 |
| Additive 1 | 0.25 | — | 0.25 | 0.25 |
| Additive 2 | 0.25 | — | 0.25 | 0.25 |
| Thermal Oxidation DSC-OIT, min. | | | | |
| at 190° C. | 6.46 | 0.25 | 22.36 | 6.56 |
| at 180° C. | 7.77 | 0.27 | >30 | 15.43 |

What we claim is:

1. An olefin polymer composition comprising an olefin polymer and a polysiloxane having pendant sterically hindered phenol moieties of the formula:
pendant sterically hindered phenol moieties of the formula:

$$MD_xD^*_yM \qquad (I)$$

wherein $M = R''R_2SiO_{\frac{1}{2}}$

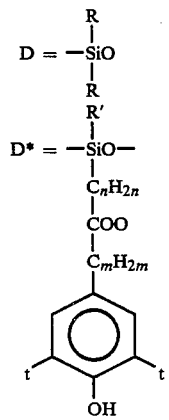

R = phenyl or a lower alkyl group;
R' = phenyl, phenethyl or an alkyl group having 1 to about 8 carbon atoms;
R'' = is phenyl, or an alkyl group or alkoxy group having from 1 to about 30 carbon atoms;
t = tert-butyl;
n has a value of from 0 to about 10;
m has a value of about 2 to about 10;
x has a value of from 0 to about 250; and
y has a value of from 2 to about 250.

2. An olefin polymer composition as claimed in claim 1 wherein said polysiloxane having pendant sterically hindered phenol moieties is employed in an amount sufficient to stabilize said olefin polymer.

3. An olefin polymer composition as claimed in claim 2 wherein in said polysiloxane having pendant sterically hindered phenol moieties R'' is an alkyl group having from 1 to about 20 carbon atoms.

4. An olefin polymer composition as claimed in claim 2 wherein in said polysiloxane having pendant sterically hindered phenol moieties R'' is an alkyl group having from 1 to about 3 carbon atoms.

5. An olefin polymer composition as claimed in claim 2 wherein in said polysiloxane having pendant sterically hindered phenol moieites all of the R, R' and R'' groups are methyl groups.

6. An olefin polymer composition as claimed in claim 2, wherein said polysiloxane having pendant sterically hindered phenol moieties stabilizer is added at a concentration of from about 0.005 percent to about 2 percent by weight, based on olefin polymer.

7. An olefin polymer composition as claimed in claim 2, wherein said polysiloxane having pendant sterically hindered phenol moieties stabilizer is added at a concentration of from about 0.05 percent to about 0.3 percent by weight, based on olefin polymer.

8. An olefin polymer composition as claimed in claim 2 wherein in said polysiloxane having pendant sterically hindered phenol moieties all of the R and R' groups are methyl.

9. An olefin polymer composition as claimed in claim 2 wherein in said polyoxanes having pendant sterically hindered phenol moieties n has a value of 1 to 3.

10. An olefin polymer composition as claimed in claim 2 wherein in said polysiloxanes having pendant sterically hindered phenol moieties m has a value of 2 or 3.

11. An olefin polymer composition as claimed in claim 2 wherein in said polysiloxanes having pendant sterically hindered phenol moieties x plus y has a value of less than 50.

12. An olefin polymer composition as claimed in claim 2 wherein the nominal structure of said polysiloxanes having pendant sterically hindered phenol moieties is

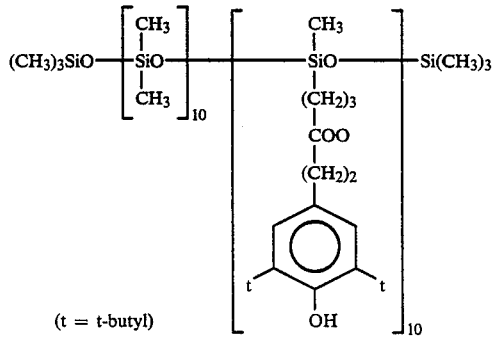

(t = t-butyl)

13. An olefin polymer composition as claimed in claim 2 wherein the nominal structure of said polysiloxanes having pendant sterically hindered phenol moieties is
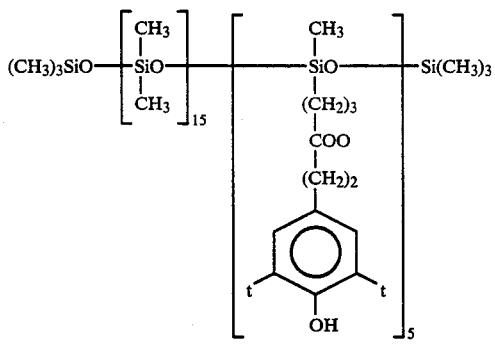
14. An olefin polymer composition as claimed in claim 2 wherein the nominal structure of said polyoxanes having pendant sterically hindered phenol moieties is
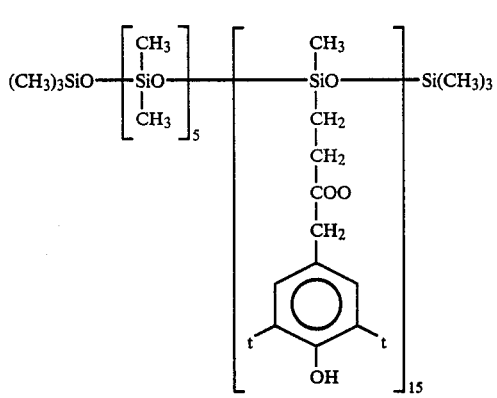
* * * * *